D. PUTNEY.
ANIMAL TRAP.
APPLICATION FILED APR. 10, 1914.
1,116,483.
Patented Nov. 10, 1914.
2 SHEETS—SHEET 2.
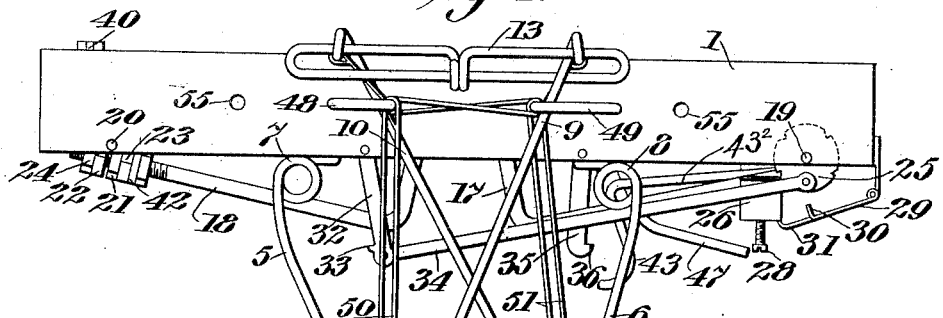
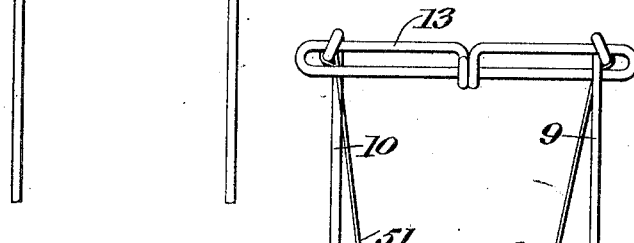
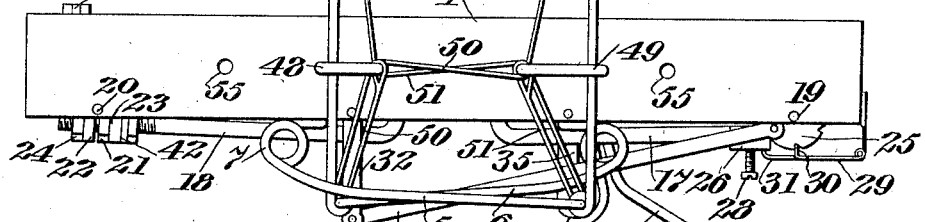
WITNESSES
INVENTOR
David Putney

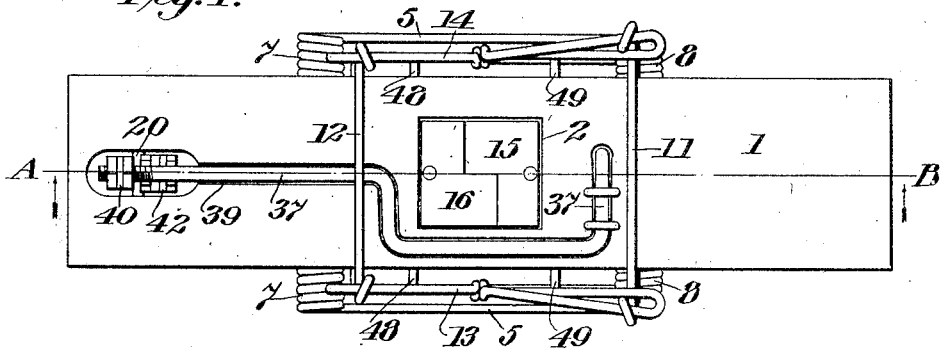
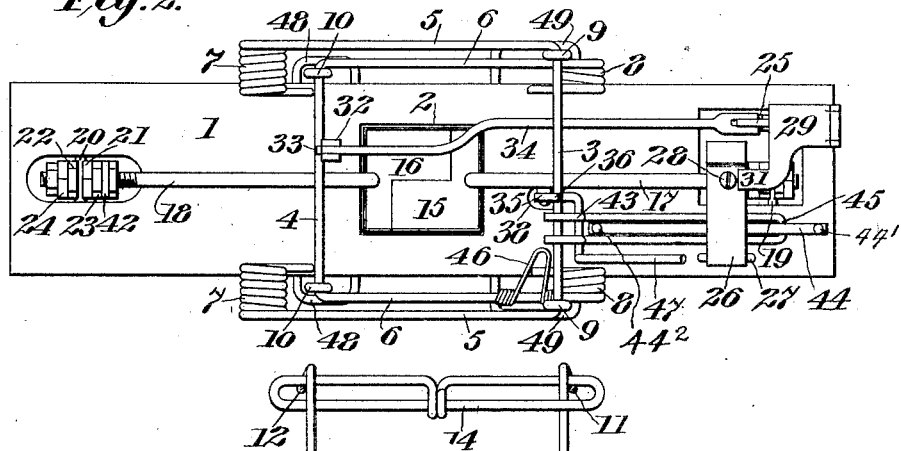
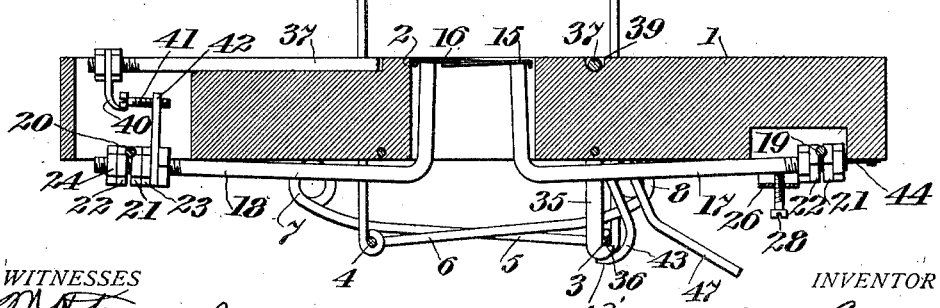

UNITED STATES PATENT OFFICE.

DAVID PUTNEY, OF WEISER, IDAHO.

ANIMAL-TRAP.

1,116,483.  Specification of Letters Patent.  Patented Nov. 10, 1914.

Application filed April 10, 1914. Serial No. 830,945.

*To all whom it may concern:*

Be it known that I, DAVID PUTNEY, a citizen of the United States, residing at Weiser, in the county of Washington and State of Idaho, have invented a certain new and useful Improvement in Animal-Traps, of which the following is a full, clear, and exact description.

The invention consists in its elementary form of an animal trap of the choker type, having a spring-actuated choker element and a trigger panel carried by an arm which is pivotally mounted upon and near one end of the platform of the trap, so that the panel may be moved relatively to the platform in setting the trap and in its operation to catch an animal, the operation of the panel and consequently the choker element being controlled by a rocker arm pivotally mounted upon the platform near its opposite end and having its opposite ends arranged for coöperation with the choker element and the trigger panel arm respectively, so as respectively to hold the choker element in set position and to release it.

The invention also consists in a quick-acting trap which is capable of being sprung by and of capturing an animal approaching it from any one of four different directions.

The invention also provides a trap which is very sensitive and the sensitiveness of which may be adjusted so that the trap may be sprung by a very light animal, and furthermore the trap is so constructed that it may be concealed from view by covering it with earth without thereby affecting its operativeness.

A further feature of the invention comprises means whereby the animal, when caught, will be prevented from slipping from under the choker loops and escaping.

The invention also consists in a trap of the choker type, having a pair of choker elements connected to separate springs and a trigger mechanism of peculiar construction, whereby when one spring is released it will release the other.

The invention also comprises means whereby the energy of the two springs may be combined, all as I will proceed now to explain and finally claim.

In the accompanying drawings illustrating the invention, in the several figures of which like parts are similarly designated, Figure 1 is a top plan view of the trap, set. Fig. 2 is a bottom plan view of the trap, set. Fig. 3 is a section taken in the plane of line A B, Fig. 1. Fig. 4 is a side elevation of the trap in sprung position and showing the means whereby the energy of both springs may be combined. Fig. 5 is a view similar to Fig. 4 but showing the trap, set. Fig. 6 is a partial view of one of the choker loops provided with the means for preventing the escape of the trapped animal. Fig. 7 is a section taken on line C D of Fig. 6. Fig. 8 shows a winding device for use in setting the trap.

The trap comprises a base or platform 1, having about midway of its length an opening 2 to receive the trigger panel. At about equal distances from the ends of the opening 2 are the choker elements, or springs, which comprise end cross-pieces 3 and 4 and side arms 5—5 and 6—6 which latter terminate in coils 7—7 and 8—8, respectively secured to the platform 1. The cross-piece 3 is wider than cross-piece 4 and the side arms 5—5 are longer than side arms 6—6, so that one choker element may work within the other. Connected to the end cross-pieces by arms 9—9 and 10—10 are the choker loops 11 and 12 which extend across the upper side of the platform so as to catch any animal approaching from either end of the trap, and the loops 11 and 12 are connected by loops 13 and 14 for the purpose of catching any animal approaching the trap from either side.

The trigger panel is made in halves 15 and 16 so as in effect to telescope each other when depressed. These halves 15 and 16 are attracted to substantially L shaped arms 17 and 18, respectively, which are pivotally mounted upon the platform, as by shafts 19 and 20, respectively, by means of grooved nuts 21 and 22, whereby longitudinal adjustment of the arms may be effected and these nuts are held in adjusted position by jam nuts 23 and 24. Mounted upon the shaft 19 is a notched wheel 25 (shown best in Figs. 4 and 5). A transverse plate 26 pivoted at 27 on the platform straddles the arm 17 and is vertically adjustable with relation thereto by means of a set-screw 28. At the end of the platform 1 is pivoted a pawl 29 having a tooth 30 adapted to engage the notches in the wheel 25, and it also has a finger 31 which rests upon plate 26 when pawl 30 is in engagement with a notch in wheel 25.

As shown most clearly in Figs. 2 and 4, an arm 32 having a detent 33 is pivoted in the platform 1 and is connected at its upper end by a link 34 with the wheel 25. This arm and its detent by the connection with wheel 25 and its associated parts above mentioned, serves to hold one of the springs or choker elements of the trap in set position. The other spring is held in set position by a rocker arm 35 (Fig. 4) having a detent 36, and this arm is a continuation of a bar 37 which is bent at right angles to pass through an opening 38 in the platform 1, and this bar extends along the upper side of the platform 1 in a groove 39 and its end is turned down and provided with one of the adjustable complemental members 40 of the spring release (shown clearly in Fig. 3), the other member of which is an adjustable screw 41 carried by an upstanding adjustable arm 42 on the trigger panel arm 18. Thus it will be seen that when the trigger panel is depressed the parts 40 and 41 will be disengaged and the detent 36 will release the spring which it holds down. The other spring will be released also because the arm 17 will depress plate 26 thereby disengaging pawl 30 from the notch of wheel 25 which will allow arm 32 to spring back.

In case both halves of the trigger panel should not be depressed, the release of one spring will release the other.

43 is a hook, shown as formed of bent wire, and having its upstanding bill $43^1$ arranged adjacent to the opening 2, and its body $43^2$ extending toward the right-hand end of the platform, Figs. 2 and 3. This body portion is frictionally engaged by a flat spring 44 secured at its opposite ends, $44^1$, $44^2$, to the platform, and such engagement of the hook by the spring admits of a longitudinal sliding adjustment of the hook upon the platform so as to enable the hook to be arranged coöperatively with the cross-piece 3 of the choker element. In order that the hook may not only slide on the platform but also rise and fall thereon, its body end 45 serves as a pivot under the spring 44. The invention, however, is not limited to the details of construction of this hook, it being sufficient that the hook should be held movably. Should the cross-piece 3 be released, it will in springing away from the platform 1 depress the hook 43 which in turn will depress the plate 26, thus releasing cross-piece 4 the same as if plate 26 were depressed by arm 17. If cross-piece 4 is released, its motion will bring the trip 46 which is fixed on arm 6 in contact with lever 47, the inner end of which will push against arm 35 thereby releasing cross-piece 3.

Suitable guides 48 and 49 are provided for the arms of the choker loop on each side of the platform.

The energy of both springs may be combined by means of cords, ropes, or chains, as the size of the trap requires, which pass from one to the other. There are four such cords, two on each side, and their method of attachment is illustrated in Figs. 4 and 5. The cord 50 is fastened at one end to the guide 48, whence it passes under the end-piece 4, thence through and over guide 48 and under and through guide 49 to choker loop 11, where its other end is fastened. Cord 51 is fastened at one end to guide 49, whence it passes under end-piece 3, thence through and over guide 49 and under and through guide 48 to choker loop 12, where its other end is fastened.

All of the choker loops may be provided with teeth 52 to impale the game, held in place in any suitable manner, and such teeth I have illustrated in Figs. 6 and 7 as bent wires spaced apart by small nuts or washers 53 screwthreaded or otherwise secured in the loop.

The setting of the trap is greatly facilitated, especially if it is large and the springs stiff, by the use of winding devices or windlasses such as illustrated in Fig. 8. These are rods 54 which may be inserted in holes 55 in the platform, and they have cranks 56 and handles 57 for winding. Secured to these rods 54 in any suitable manner such as by slots 58 are tapes, ropes, or chains 59 having hooks 60 which are adapted to engage the cross-pieces 3 and 4 at each side so that as the tapes 59 are wound upon the rods 54 as they are turned, the springs will be drawn toward the platform. To set the trap the springs are depressed toward the platform, one passing over the other because the cross-piece 3 and arms 5—5 of one are longer than the cross-piece 4 and arms 6—6 of the other, and when sufficiently depressed the detents 33 and 36 will be snapped over the cross-pieces 4 and 3, respectively, and pawl 30 will be engaged with a notch in wheel 25 and the complemental parts 40 and 41 will be engaged. Then hook 43 will be moved up so that it is over cross-piece 3. If plate 26 does not touch finger 31 it may be adjusted until it does so, by means of set-screw 28. Moreover set-screw 28 may be screwed in until pawl 30 barely engages the notch in wheel 25, thus making the trap very sensitive. A similar adjustment is possible between the parts 40 and 41. If the windlasses are used to set the trap, they should be withdrawn after it is set. The trap being set, a small hole is dug to receive the projecting mechanism on its under side, so that the top of the platform is flush with the ground and then the choker loops and platform and trigger panel may be concealed by daubing them with mud.

Various permutations of the novel features of the trap are permissible, as, for example, one of the choker elements and its associated parts, such as shown at the right in Figs. 2, 3, 4 and 5, may be omitted, and a complete single trap thereby produced, of the type shown in my co-pending application Serial No. 782,510; or, again, a double trap having choker loops on four sides as shown, might be operated by a single trigger panel by omitting those parts peculiar to the operation of the double panel, and it is therefore to be understood that I do not hereby limit my invention to the exact details of construction herein shown and described, as it is obvious that various changes may be made without departing from the spirit of the invention and the scope of the appended claims.

What I claim is:—

1. In an animal trap of the choker type, a platform having an opening, a spring-actuated choker element mounted upon the platform, a trigger panel, an arm to which the panel is fixed pivotally mounted upon and near one end of the platform and by which said panel is adapted to be moved relatively to said opening, a rocker arm pivotally mounted at one end upon the platform near its opposite end, said rocker arm having its opposite ends adapted to engage both the choker element and the panel arm.

2. In an animal trap, a platform, a choker loop, mounted on said platform, a spring connected to said loop, and means carried by the platform and adapted to be connected with the spring for depressing said spring in order to set the trap.

3. An animal trap, comprising a platform, a pair of choker loops arranged transversely of and above said platform and a pair of springs connected with said loops below said platform, whereby said loops are brought in contact with said platform.

4. An animal trap, comprising a platform, a pair of choker loops arranged transversely of and above said platform, a pair of springs arranged below said platform and connected with said loops for operating them, means for holding said springs in set position, and means connected therewith for releasing said springs to bring said loops into contact with said platform.

5. An animal trap, comprising a platform, a pair of choker loops arranged above said platform and transversely thereof, a second pair of choker loops carried by said first pair and arranged longitudinally of said platform, a pair of springs arranged below said platform and connected with first-mentioned loops whereby they may be brought into contact with said platform, means for holding said springs in set position, means connected thereto for releasing said springs, and means operated by each of said springs for releasing the other spring when one is released before the other.

6. An animal trap, comprising a platform, a pair of choker loops, springs connected thereto for operating said loops, means for holding said springs in set position, a divided trigger panel for releasing said holding means, whereby the depression of one division of said panel will depress the other to release both springs at the same instant, and means independent of said trigger panel operated by each of said springs whereby the release of one of the springs will insure the release of the other.

7. In a double spring animal trap, a platform, a trigger mechanism, a rocker arm having a detent at one end to hold one of said springs in set position and a piece at its other end to engage a complemental piece of said trigger mechanism, a double ended lever mounted upon said platform and having one of its ends engaging said rocker arm, and a trip on the other spring for engaging the other end of said lever when said last mentioned spring is released, whereby said lever will be pushed against said rocker arm to disengage its detent from said first mentioned spring to release it.

8. An animal trap, comprising a platform, a plurality of choker loops, a pair of springs connected to said loops for causing them to operate, means for holding said springs in set position, and means connected with said platform, springs and loops for combining the energy of both springs when they are released.

9. An animal trap, comprising a platform, spring choker loops coacting therewith, means for holding said loops in set position, means for releasing said holding means, and devices for positively adjusting the sensitiveness of said holding means and for retaining such adjustment.

10. An animal trap, comprising a platform, a trigger panel arranged in and hinged to said platform flush with the top thereof and adapted to be depressed by the tread of an animal, and a plurality of spring choker loops arranged about said trigger panel to catch game coming from any direction, said loops being brought into operative relation with said platform by the depression of said trigger panel.

11. In a double spring trap, a setting mechanism for each of said springs, and a divided trigger panel having one of its divisions operatively connected to each of said setting mechanisms for releasing both of said setting mechanisms simultaneously.

12. In an animal trap, a spring, a choker loop actuated by said spring, a platform upon which said spring is mounted having an opening, a trigger panel arranged in said opening, an arm on one end of which said panel is mounted and the other end of which is provided with an adjustable screw, a rocker arm having means at one end for holding said spring in set position and at its other end means for engaging said adjustable screw.

13. In an animal trap, a platform having an opening, a trigger panel adapted to project into said opening, an arm upon one end of which said panel is mounted and the other end of which is pivotally mounted upon said platform and provided with an adjustable arm carrying an adjustable screw, and a rocker arm pivotally mounted on said platform and provided with a detent to engage said spring and hold it in set position and having an extension carrying an adjustable part to engage said screw whereby said detent is retained in engagement with said spring and disengaged from said spring when said trigger panel is depressed.

14. In an animal trap, a platform, a pair of choker loops arranged above said platform, and springs connected to said loops arranged below and secured to said platform having cross pieces and arms extending from said cross pieces, the cross piece of one of said springs being wider and the arms longer than those of the other spring so that it may pass over the other spring, and means for releasably securing said springs in set position.

15. In an animal trap, a pair of choker loops and a pair of springs connected to said loops and of different dimensions to thereby admit of one of said springs telescoping within the other.

16. In an animal trap, a platform, choker loops, springs secured to said platform and connected with said loops, and means mounted on the platform and operable thereupon for depressing said springs in order to set the trap.

17. In an animal trap, a platform, a pair of springs mounted on said platform, choker loops connected with said springs, bearings in said platform to receive a pair of windlasses, and flexible connections adapted to be applied to said windlasses and connected with said springs whereby as said connections are wound upon said windlasses the springs will be depressed toward said platform so that the trap may be set.

18. In an animal trap, a platform, a pair of springs mounted thereon, a pair of choker loops connected with said springs, a pair of windlasses mounted transversely upon said platform and protruding upon both sides of said platform, a pair of tapes connected at one of their ends with the protruding ends of each of said windlasses on both sides of said platform and having hooks at their other ends to engage said springs, and operating means applied on one protruding end of each of said windlasses whereby they may be turned to wind up the tapes to thereby depress said springs to set the trap.

19. In an animal trap, a platform, a pair of springs secured thereto, a plurality of choker loops connected to said springs, a trigger panel arranged in an opening in said platform, an arm to which said panel is secured, said arm being pivoted to said platform near its end, a notched wheel secured to the shaft on which said arm is pivoted, a plate straddling said arm, a pawl having a tooth engaging said notched wheel and also having a finger which rests upon said plate when the trap is set, an arm having a detent adapted to hold one of said springs in set position, and a link connecting said arm and wheel whereby when the detent engages the spring the tooth of said pawl will engage a notch in said wheel to hold the arm and detent in set position and when the arm to which said panel is secured is depressed the pawl by contact of its finger with the plate will be raised out of the notch to allow the arm and detent to spring away from said spring to release it.

20. In an animal trap of the choker type, a choker loop, and means applied to the choker loop for impaling the game when caught by the loop and thereby precluding its escape.

21. In a double spring trap, a setting mechanism for each of said springs, and means comprising an adjustable spring-depressed and retained hook adapted to engage one of said springs for releasing the setting mechanism of the other spring when said first mentioned spring is released.

22. In a double spring trap, a platform, a setting mechanism for each spring mounted on said platform, and means comprising a hook adapted to be slidingly adjusted on said platform to engage one spring for releasing the setting mechanism of the other spring when said first mentioned spring is released.

In testimony whereof I have hereunto set my hand this 6th day of April A. D. 1914.

DAVID PUTNEY.

Witnesses:
 A. B. BROWN,
 B. L. BURLEY.

It is hereby certified that in Letters Patent No. 1,116,483, granted November 10, 1914, upon the application of David Putney, of Weiser, Idaho, for an improvement in "Animal-Traps," errors appear in the printed specification requiring correction as follows: Page 1, line 93, for the word "attracted" read *attached;* page 3, line 65, after the word "with" insert the word *said;* and that the said Letters Patent should be read with these corrections therein that the same may conform to the record of the case in the Patent Office.

Signed and sealed this 24th day of November, A. D., 1914.

[SEAL.] R. F. WHITEHEAD,

*Acting Commissioner of Patents.*